Feb. 18, 1947.  M. THORUD  2,415,976

PASTRY SHELL CUTTER

Filed Nov. 30, 1944

Inventor:
Marvin Thorud
By Lee J. Gary
Attorney.

UNITED STATES PATENT OFFICE 2,415,976

PASTRY SHELL CUTTER

Marvin Thorud, Evanston, Ill.

Application November 30, 1944, Serial No. 565,849

8 Claims. (Cl. 30—130)

This invention relates to a device for cutting pastry shells from a sheet of dough, and has for an object the provision of a device of this kind which is relatively simple in operation, inexpensive in construction and which will not readily get out of order.

This invention further contemplates the provision of a device of this kind comprising an outer cutter for cutting a pastry shell blank from a sheet of dough, and an inner cutter journaled for rotational movement for cutting semi-circular segments of dough from the central portion of the pastry shell blank.

This invention further contemplates the provision of valve controlled means for directing a stream of air downwardly through the inner cutter for the purpose of removing any semi-circular segments of dough which might become attached thereto.

This invention further contemplates the provision of a pastry shell cutter embodying improved manually operable means for rotating the inner cutter through an arc of not less than 180° for radially cutting a central portion from the pastry shell blank.

This invention embodies other novel features, details of construction and arrangement of parts which are hereinafter set forth in the specification and claims, and illustrated in the accompanying drawing wherein:

Figure 1:
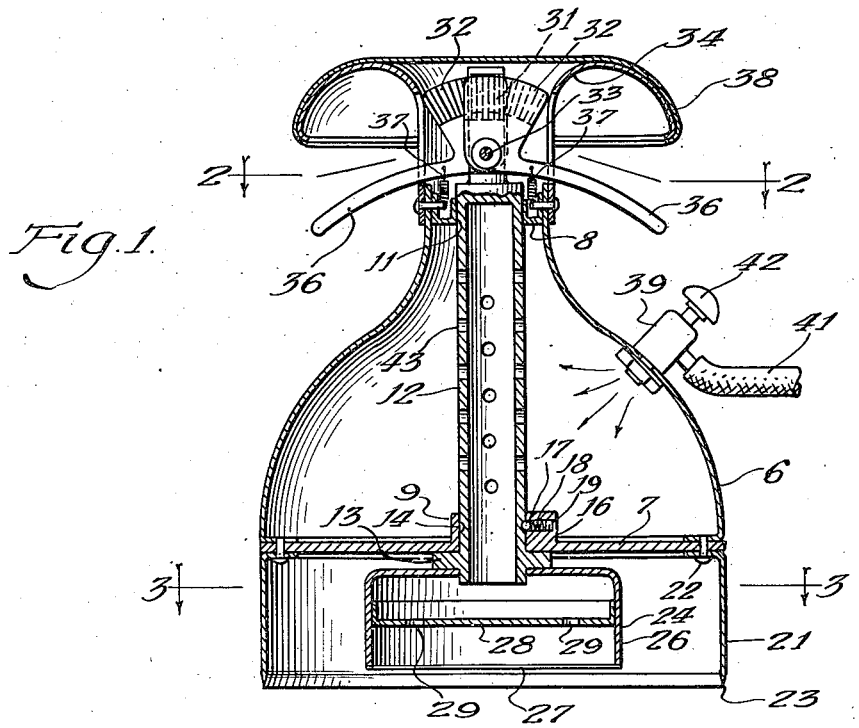
Fig. 1 is a vertical sectional view showing a pastry shell cutter embodying features of this invention.
Figure 2:
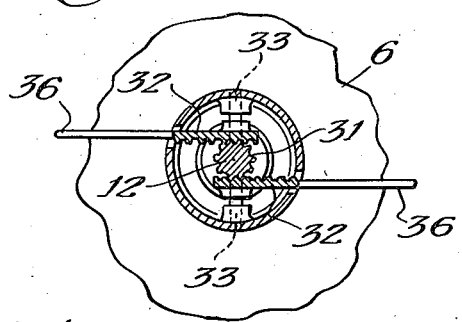
Fig. 2 is a sectional view taken along the line 2—2 of Fig. 1.
Figure 3:
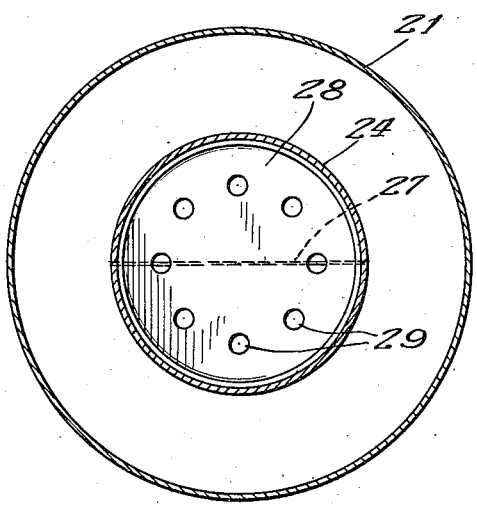
Fig. 3 is a sectional view taken along the line 3—3 of Fig. 1.

Referring now to the drawing for a better understanding of this invention, the pastry shell cutter is shown as comprising a housing 6 having a partition 7 secured to its lower end and a partition 8 secured to its upper end. The partitions 7 and 8 are formed with bearings 9 and 11, respectively, to receive a shaft 12 formed with an annular flange 13 and an annular groove 14. The shaft 12 is held against upward movement by means of the flange portion 13 which engages against the underside of the partition 7. A boss 16 is formed on the partition 7 and provided with an aperture to receive a ball 17, a compression spring 18 and a set screw 19. The ball 17 engages the wall of the recess 14 upon assembly, to prevent downward movement of the shaft 12.

An outer cutter 21 is secured against the bottom of the partition 7 and to the lower end of the housing 6 by means of screws 22. The cutting edge 23 of the outer cutter may be either circular or scalloped, as desired.

An inner cutter 24 is secured to the lower end of the shaft 12 by means of welding or brazing, and is formed with a circular cutting edge 26 disposed a predetermined distance above the cutting edge 23 provided on the outer cutter 21. A straight wire 27 extends transversely across the bottom of the inner cutter and has its ends welded to diametrically opposed portions of the cutting edge 26. A partition 28 formed with apertures 29 is soldered or brazed to the inner wall of the cutter 24.

A plurality of gear teeth 31 are formed on the upper end of the shaft 12 for engagement by a pair of gear segments 32—32 journaled on studs 33—33 provided on a handle 34. The gear segments are formed with finger engaging portions 36—36 and are normally held in their downward positions, shown in Fig. 1, by means of tension springs 37—37. If desired, a cap 38 may be mounted on the handle 34 for the purpose of covering the central opening formed in the handle.

Secured to the side wall of the housing 6 is provided a suitable air control valve 39 which is connected to a source of air under pressure by means of a flexible conduit 41. The type of valve illustrated in the drawing is operated by means of a reciprocable valve stem 42 for supplying air under pressure to the interior of the housing 6 and thence through openings 43 provided in the shaft 12, and thence downwardly through the shaft and through the openings 29 provided in partition 28.

Figure 4:
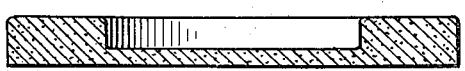
Fig. 4 is a sectional view showing the type of pastry shell adapted to be cut from a sheet of dough by the cutter.

In the operation of this device for forming a pastry shell of the type illustrated in Fig. 4, the outer cutter 21 is adapted to be pressed downwardly to cut through a sheet of dough to thus form a pastry shell blank. During this downward movement, the cutting edge 26 and cutting wire 27 of the inner cutter 24 are adapted to cut approximately two-thirds of the distance through the pastry shell blank, after which the finger portions 36—36 are pulled upwardly to rotate the shaft 12 and the cutter 24 carried thereby through an arc of not less than 180°, and thus causing the wire 27 to radially cut a pair of semi-circular segments of dough out of the center of the pastry shell blank. The device is then lifted upwardly and in the event the semi-circular segments of dough are stuck to the inner cutter or wire 27 the valve 39 is operated to direct a blast of air downwardly through the inner cutter to remove the dough therefrom.

While this device has been shown in the form of a manually operable pastry shell cutter, it is contemplated that this invention could readily be embodied in a machine comprising a plurality of cutters arranged for simultaneous operation in cutting any desired number of pastry shells from a large sheet of dough.

Figure 5:
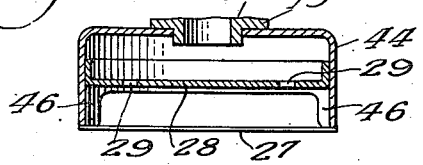
Fig. 5 is a fragmentary sectional view showing a modified form of this invention wherein the inner cutter is formed with a pair of diametrically opposed knife portions.

Referring now to Fig. 5, an inner cutter 44 is provided with a pair of diametrically opposed knife portions 46—46 having a cutting wire 27 secured to the lower edges thereof for cutting the central portion from a pastry shell blank in the manner heretofore described.

While this invention has been shown in but two forms, it is obvious to those skilled in the art that it is not so limited but is susceptible of various changes and modifications without departing from the spirit and scope of the claimed invention.

I claim as my invention:

1. A pastry shell cutter comprising an outer cutter for cutting a pastry shell blank from a sheet of dough, an inner cutter journaled for rotational movement with respect to said outer cutter and having its cutting edge disposed above the cutting edge of the outer cutter to cut and circumferentially define a portion to be removed from the center of the pastry shell blank, and a wire extending transversely across the bottom of said inner cutter and having its ends connected to diametrically opposed sides of the cutting edge thereof for radially cutting the portion to be removed from the pastry shell blank upon rotational movement of the inner cutter, mechanical actuating means including a pair of gears for rotating said inner cutter relative to said outer cutter through an arc of approximately 180°.

2. A pastry shell cutter comprising an outer cutter for cutting a pastry shell blank from a sheet of dough, an inner cutter journaled for rotational movement with respect to said outer cutter and having its cutting edge disposed above the cutting edge of the outer cutter to cut and circumferentially define a portion to be removed from the center of the pastry shell blank, a wire extending transversely across the bottom of said inner cutter and having its ends connected to diametrically opposed sides of the cutting edge thereof for radially cutting the portion to be removed from the pastry shell blank upon rotational movement of the inner cutter, gear means for rotating said inner cutter through an arc of approximately 180°, and means for returning said inner cutter to its normal position.

3. A pastry shell cutter comprising an outer cutter for cutting a pastry shell blank from a sheet of dough, an inner cutter journaled for rotational movement with respect to said outer cutter and having its cutting edge disposed above the cutting edge of the outer cutter to cut and circumferentially define a portion to be removed from the center of the pastry shell blank, a wire extending transversely across the bottom of said inner cutter and having its ends connected to diametrically opposed sides of the cutting edge thereof for radially cutting the portion to be removed from the pastry shell blank upon rotational movement of the inner cutter, and means for directing a stream of air downwardly through said inner cutter.

4. A pastry shell cutter comprising an outer cutter for cutting a pastry shell blank from a sheet of dough, an inner cutter journaled for rotational movement with respect to said outer cutter and having its cutting edge disposed above the cutting edge of the outer cutter to cut and circumferentially define a portion to be removed from the center of the pastry shell blank, a wire extending transversely across the bottom of said inner cutter and having its ends connected to diametrically opposed sides of the cutting edge thereof for radially cutting the portion to be removed from the pastry shell blank upon rotational movement of the inner cutter, gear means for rotating said inner cutter, and valve means for directing a stream of air downwardly through said inner cutter.

5. In a pastry shell cutter, a cutter having a circular cutting edge, a straight wire having its ends connected to diametrically opposed portions of said cutting edge, and air control means for directing a stream of air downwardly through said cutter.

6. In a pastry shell cutter, a housing, an outer cutter secured to said housing, an inner cutter journaled in said housing, and gear means operative for rotating said inner cutter through an arc of approximately 180°.

7. In a pastry shell cutter, a housing, an outer cutter secured to said housing, an inner cutter journaled in said housing, a driving gear journaled on said housing and a driven gear provided on said inner cutter, said inner cutter having a circular and transverse cutting edge.

8. In a pastry shell cutter, a housing, an outer cutter secured to said housing, an inner cutter journaled in said housing, means for rotating said inner cutter, said inner cutter having a circular and transverse cutting edge, and valve means for directing a stream of air into said housing and downwardly through said inner cutter.

MARVIN THORUD.

REFERENCES CITED

The following references are of record in the file of this patent:

UNITED STATES PATENTS

| Number | Name | Date |
|---|---|---|
| 596,277 | Marston | Dec. 28, 1897 |

FOREIGN PATENTS

| Number | Country | Date |
|---|---|---|
| 788,641 | French | July 29, 1935 |